United States Patent [19]

Longiny et al.

[11] 4,345,884
[45] Aug. 24, 1982

[54] PUMP DRIVE

[75] Inventors: Michael A. Longiny, Fountain Valley; Dimitar Kalchev, Montebello; Thomas K. Zinn, Chino, all of Calif.

[73] Assignee: Peerless Pump Division, Indian Head Inc., Montebello, Calif.

[21] Appl. No.: 115,941

[22] Filed: Jan. 28, 1980

[51] Int. Cl.³ .............................................. F04B 49/00
[52] U.S. Cl. ...................................... 417/359; 60/364
[58] Field of Search .................... 417/359; 60/330, 364

[56] References Cited

U.S. PATENT DOCUMENTS

| | | | |
|---|---|---|---|
| 1,586,900 | 6/1926 | Hollander | 417/359 |
| 1,725,401 | 8/1929 | Layne | 417/359 |
| 2,210,401 | 8/1940 | Fulton | 417/359 |
| 2,441,356 | 5/1948 | Hertrich | 60/358 |
| 2,665,553 | 1/1954 | Foster et al. | 60/364 |
| 3,581,502 | 6/1971 | Thylefors | 60/364 X |
| 3,873,244 | 5/1975 | Jaggi | 417/424 |

FOREIGN PATENT DOCUMENTS

| | | | |
|---|---|---|---|
| 1053884 | 3/1959 | Fed. Rep. of Germany | 60/330 |
| 1202592 | 10/1965 | Fed. Rep. of Germany | 60/330 |

OTHER PUBLICATIONS

Vertical Lineshaft Turbine Pumps; Brochure B-141; 1977, Peerless Pump; Montebello, Calif.; Indianapolis, Ind.

Primary Examiner—Leonard E. Smith
Attorney, Agent, or Firm—Lyon & Lyon

[57] ABSTRACT

A drive mechanism suitable for vertical pumps driven by hollow shaft motors includes an output shaft, a variable speed transmission unit for mounting above the motor, and means for vertically adjusting the position of the output shaft, the adjusting means being located above the transmission unit.

17 Claims, 2 Drawing Figures

PUMP DRIVE

BACKGROUND OF THE INVENTION

The present invention is directed to pump driving mechanisms, and particularly variable speed mechanisms for driving vertical pumps.

A variety of mechanisms for driving pumps are known. For example, Hans Jaggi in U.S. Pat. No. 3,873,244 describes an electric variable-speed drive comprising a hollow shaft electric motor with a hydrodynamic transmission unit above the motor as an integral machine. The variable speed mechanism is desirable so that the speed of the pump can be controlled independently of the speed of the motor. By such independent control, energy is not wasted by operating the pump at a higher speed than is required for a given situation.

Although the pump drive mechanism shown by Jaggi is useful for many applications, such as sewage and waste water pumps, it is of limited use in deep well applications. This is because in deep well applications such as in geothermal wells, it is difficult to determine the necessary length for the pump shaft due to variations in the threaded column pipe makeup and due to changes in the column pipe length from expansion and contraction with temperature changes. By thermal expansion, a pump shaft in a geothermal well can increase in length by as much as four inches. The Jaggi mechanism provides no mechanism for dealing with these changes.

Another problem with the Jaggi mechanism is that it is a complete unit comprising a motor and a hydrodynamic transmission unit of unitized construction. It would be difficult to adapt the Jaggi unit for retrofitting existing motors and pumps so that they can be supplied with a variable speed transmission unit. For example, to so use the Jaggi unit would necessitate discarding the Jaggi motor.

Mechanisms for vertically adjusting a pump shaft while retaining the motor in a vertical position are known. For example, M. E. Layne in U.S. Pat. No. 1,715,401 describes such a mechanism. However, adaptation of the Jaggi drive mechanism for vertical adjusting of the pump shaft is not readily accomplished.

In view of the foregoing, it is evident there is a need for a pump driving mechanism which can be retrofitted to existing pump and motor installations, where the pump driving mechanism includes a variable speed transmission unit and means for vertical adjustment of the pump shaft.

SUMMARY OF THE INVENTION

The present invention is directed to a novel pump driving mechanism with these desirable features, and to the novel pump driving mechanism in combination with a motor. The mechanism includes a variable speed transmission unit and a rotatable output shaft, called the pump shaft, for positioning within the hollow drive shaft of a hollow shaft motor. A first end portion and a second end portion of the output shaft extend beyond the corresponding ends of the hollow drive shaft. The second end portion of the output shaft is capable of being connected to a pump to be driven by the output shaft.

The variable speed transmission unit is located between the ends of the output shaft and is capable of being mechanically coupled to the hollow drive shaft. The transmission unit is coupled to the first end portion of the output shaft by coupling means for transmitting power from the motor to the output shaft for rotation of the output shaft at a rate proportional to the rate of rotation of the hollow shaft.

The drive mechanism also includes adjusting means at the first end portion of the output shaft for adjusting the position of the output shaft relative to the motor and relative to the variable speed transmission unit. When the pump driving mechanism is connected to a pump, it is oriented so that the variable speed transmission unit is closer to the pump than is the adjusting means. For example, for a deep well pump, the variable speed transmission unit is above the pump and the adjusting means is above the variable speed transmission unit for quick access for easy vertical adjustment of the output shaft.

Preferably the variable speed transmission unit is a hydraulic unit. When this is the case, preferably the driving mechanism includes a rotatable sleeve around the output shaft in the section of the output shaft between the hydraulic transmission unit and the first end of the output shaft. The sleeve can be mechanically coupled to the hollow shaft or the output shaft. When the sleeve is mechanically coupled to the hollow shaft, preferably thrust bearings are provided between the coupling means and the sleeve for transmitting thrust therebetween.

This pump driving mechanism has many advantages. For example, it can be used for retrofitting existing installations comprising a hollow shaft motor and a pump. Thus, an existing fixed speed installation can easily be converted into a variable speed installation where the output shaft can be vertically adjusted as required. Furthermore, the rotatable sleeve around the output shaft prevents hydraulic fluid from reaching the output shaft and thus contaminating underground water.

IN THE DRAWINGS

These and other features, aspects and advantages of the present invention will become better understood with reference to the following description, appended claims, and accompanying drawings where:

FIG. 1 shows in partial vertical section a pump driving mechanism according to the present invention installed on top of an electric hollow shaft motor; and FIG. 2 shows in partial vertical section another pump driving mechanism according to the present invention.

DETAILED DESCRIPTION OF THE INVENTION

The present invention is directed to a pump driving mechanism which can be retrofitted to existing pump and motor installations. The present invention is also directed to the pump driving mechanism in combination with a motor. Although the pump driving mechanism is particularly useful for electric pumps used in deep well applications, it can also be used for other fluid handling apparatus and for pumps in other applications such as pumps used for oil wells, water wells, chemical processing, and the like.

The present invention will be described principally with regard to a vertical line shaft pump, although other configurations can be used. For example, it is not necessary that the pump shaft be oriented vertically.

Figure 1:
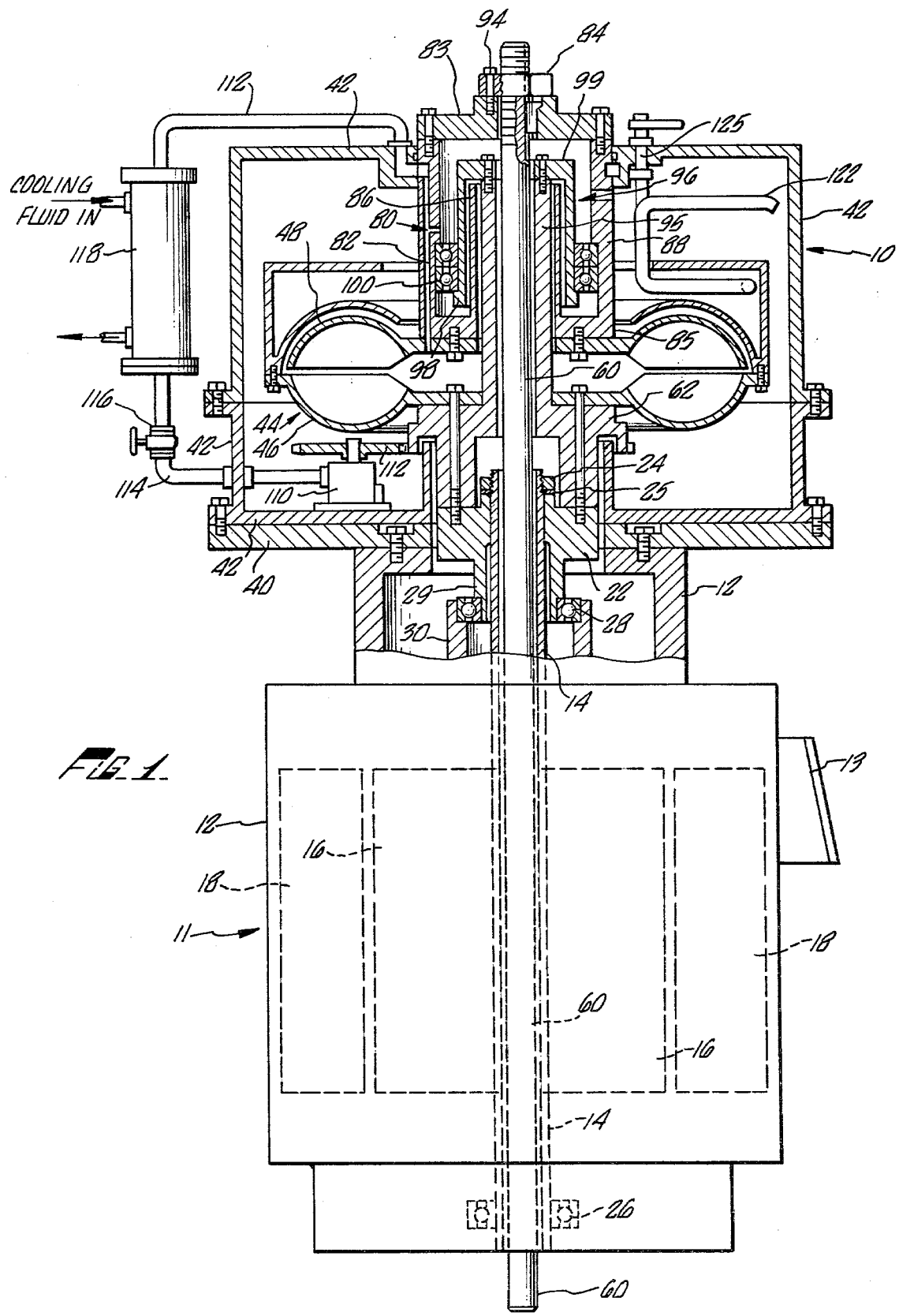

With reference to FIG. 1, there is shown in partial vertical section a pump driving mechanism 10 according to the present invention installed on top of an electric hollow shaft motor 11. The motor 11 comprises a stationary housing 12, a junction wire box 13, a rotatable, elongated, vertically oriented hollow drive shaft 14 around which are concentrically mounted a rotor 16 and a stator 18. Below the motor 11 is a pump (not shown) which can be as far down as 1500 feet below ground level.

Secured around the top portion of the hollow drive shaft 14 is a pump motor coupling 22 which is keyed to the hollow drive shaft 14 so that the motor coupling 22 rotates with the shaft 14. The pump motor coupling 22 is secured to the shaft by a nut 24 and a washer 25 threaded onto the top of the hollow shaft. The hollow shaft 14 is mounted at its lower end in lower bearings 26 and at its top end in upper bearings 28 located between the exterior wall 29 of the top motor coupling 22 and a bearing support 30 mounted on top of the electric motor housing 12. The entire motor 11, including the hollow shaft 14, can be a conventional unit provided by a motor manufacturer.

The driving mechanism 10, which can be retrofitted to an already installed hollow shaft motor and pump, includes an adapter plate 40 bolted to the motor housing 12. The adapter plate 40 can be varied as required to conform to the configuration of a particular motor. Secured to the top of the adapter plate 40 is a housing 42 for the variable speed mechanism, which in the version of the invention shown in FIG. 1, is a hydrodynamic transmission unit 44, also known as a hydrokinetic unit. Instead of a hydrodynamic transmission unit 44, other types of variable speed mechanisms such as a viscous disc or electric clutch can be used. The transmission unit 44 includes an input impeller wheel 46 and an output impeller wheel 48.

The drive mechanism 10 also includes a solid output or pump shaft 60 which projects through both ends of the hollow shaft 14. The bottom portion of the output shaft 60 is mechanically coupled to a pump by conventional means such as a threaded coupling.

The transmission unit is mechanically coupled to both the hollow motor shaft 14 and the output shaft 60 for transmitting power from the motor 11 to the output shaft 60 for rotation of the pump shaft for operation of the pump at a rate proportional to the rate of rotation of the hollow motor shaft 14. By means of the hydrodynamic transmission unit, the rate at which the pump shaft rotates can be varied while the hollow motor shaft 14 rotates at a fixed speed. The transmission unit 44 is coupled to the hollow motor shaft 14 by means of a rotatable, hollow, coupling extender 62 which is secured to the top motor coupling 22 and the input impeller wheel 46. The extender 62 is concentrically mounted around and radially spaced apart from the output shaft 60.

The transmission unit is mechanically coupled to the output shaft 60 by means of a pump drive coupling assembly 80 which comprises a thrust bearing container 82, a top coupling plate 83, and an adjusting nut 84. The thrust bearing container 82 has a base 85 secured to the output impeller wheel 48. The base 85 of the thrust bearing container 82 and the top coupling plate 83 each have a circular hole of larger diameter than the diameter of the output shaft 60 through which the output shaft extends so that it can be vertically adjusted and rotate freely. The thrust bearing container 82 comprises two upwardly extending concentric, tubular oil sleeves, a relatively shorter inner oil sleeve 86 radially spaced apart from the output shaft 60 and a relatively longer outer oil sleeve 88 concentric with and radially spaced apart from the inner oil sleeve 86. Secured to the top of the outer oil sleeve 88 is the top coupling plate 83 which is bolted by bolts 94 to the adjusting nut 84. The nut 84 is threaded onto and gib keyed to the top of the output shaft 60. By removing the bolts 94 between the nut 84 and the top coupling plate 83, and then by threading the adjusting nut 84 on the pump shaft 60, the vertical position of the output shaft 60 relative to the motor 12 and to the transmission unit 44 can be varied.

The coupling extender 62 includes a tubular vertical sleeve 95 extending upwardly around and spaced apart from the portion of the output shaft 60 between the hydraulic transmission unit 44 and the top of the output shaft 60. A function of this sleeve is to prevent hydraulic fluid of the transmission unit from reaching the output shaft. If such fluid reached the output shaft 60, it could flow down the output shaft 60 and contaminate underground water. Secured to the top of the sleeve 95 is a drum shaped thrust bearing adapter or extending member 96 having a sidewall 98 extending downwardly toward the base 85 of the thrust bearing container 82 between the inner 86 and outer 88 oil sleeves. A base portion 99 of the bearing adapter has a circular hole therethrough, through which extends the output shaft 60.

Mounted within the thrust bearing container 82 are thrust bearings 100. The bearing container 82 prevents the bearing lubricant from flowing into the housing. The thrust bearings 100 are located against the inner surface of the outer oil sleeve 88 and the outer surface of the sidewall 98 of the thrust bearing adapter 96. This is a particularly advantageous configuration because the thrust bearings have to withstand only the difference between the speed of rotation of the output shaft 60 and the hollow motor shaft 14. This is because the thrust bearing container 82 rotates at the same speed as the output shaft 60 and the bearing adapter rotates at the same speed as the hollow drive shaft 14. Thus, when the output shaft 60 is rotated at full speed, the thrust bearings 100 are subjected to little, if any, rotational wear. As used herein, the term "rotational speed" refers to revolutions per minute.

In the pump driving mechanism of FIG. 1, the thrust generated by the pump is transmitted to the motor. What occurs is that the pump thrust is passed up through the output shaft 60 via the top drive coupling assembly 80 to the thrust bearings 100, from the bearings 100 to the bearing adapter 96, and from the bearing adapter 96 to the coupling extender 62. From the coupling extender the thrust is transmitted through the top motor coupling 22 to the hollow shaft 14, and from the hollow shaft and motor coupling 22 to the motor itself.

The elements of the drive mechanism 10 which rotate at the same speed at which the hollow drive shaft rotates include the top motor coupling 22, the coupling extender 62, the input impeller wheel 46, the thrust bearing adapter 96, and the inner race of the thrust bearings 100. The elements of the drive mechanism 10 which rotate at the same speed at which the output shaft 60 rotates are the output impeller wheel 48, and the entire top drive coupling assembly 80 including the outer race of the thrust bearing container 82, the top coupling plate 83, and the adjusting nut 84.

A cooling system is provided for the hydraulic fluid used as the rotational speed control medium of the hydrodynamic transmission unit 44. The hydraulic fluid also serves as a lubricating fluid. The system includes a pump such as a gear pump 110 driven by a pump drive 112 both of which are within the variable speed drive housing 42. The pump and drive can be external of the housing. Hydraulic fluid is pumped via an output conduit 114 through the variable speed drive housing 42 past a valve 116 into a heat exchanger 118 which is provided with a cooling fluid. The heat exchanger is exterior of the drive housing 42, but can be inside the housing. The cooled hydraulic fluid passes via an input conduit 120 back towards the transmission unit 44. The level of hydraulic fluid in the transmission unit is controlled by means of a conventional collector tube. By rotating the collector tube 122 around the axis of a collector tube shaft 125, the level of hydraulic fluid in the transmission unit 44 is controlled, thereby varying the ratio between the speeds of the pump shaft and the hollow drive shaft.

Figure 2:
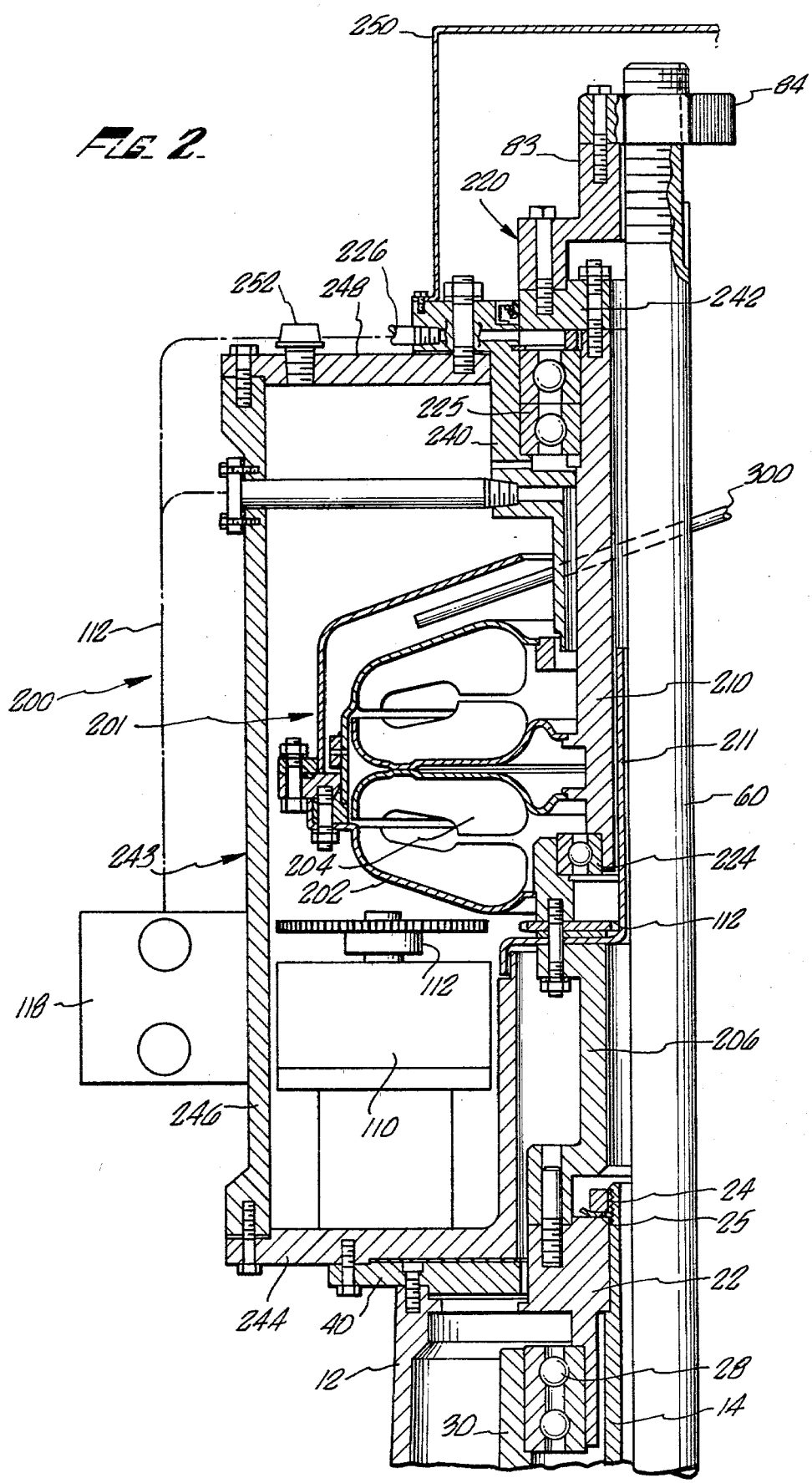

The drive assembly 200 shown in FIG. 2 is an alternate version of the invention. Those elements of the version shown in FIG. 2 which are substantially the same and perform substantially the same function as corresponding elements of the version of the invention shown in FIG. 1 bear the same reference numeral.

In FIG. 2, the transmission unit 201 comprises an input impeller wheel 202 and an output impeller wheel 204. The fluid coupling impeller 202 is mechanically coupling to the hollow drive shaft 14 by means of a hollow coupling extender 206 mounted on top of the top motor coupling 22. The coupling extender is concentric with and spaced apart from the output shaft 60. Unlike the coupling extender 62 shown in FIG. 1, the coupling extender 206 shown in FIG. 2 does not have a tubular sleeve extending along the output shaft 60 in the region above the transmission unit 201. The tubular sleeve 95 is replaced with a tubular hub 210 concentric with and radially spaced apart from the output shaft 60. Between the tubular hub 210 and the output shaft is an oil sleeve 211. The tubular hub 210 is attached to the output impeller wheel 204 at one end and at its top end is secured to a top drive coupling assembly 220. The hub 210 is rotatably mounted at its top end against thrust bearings 225. The fluid coupling bearings 224 are supported by the top portion of the coupling extension 206 adjacent to the fluid coupling impeller. The thrust bearings 225 are mounted within a bearing housing 240 and are lubricated with hydraulic oil via a pipe 226 connected to an input conduit 120 from the heat exchanger 118. A conventional collector tube 300 is used to control the level of hydraulic fluid in the transmission unit.

The top drive coupling assembly 220 of the version of the invention shown in FIG. 2 comprises a top drive coupling 83, a nut 84 and an output coupling 242. The nut 84 is bolted to the top surface of the top drive coupling 83, and the top drive coupling 83 is bolted to the output coupling 242 which is bolted to the top of the tubular hub 210. The output coupling 242 is concentrically mounted around the output shaft 60.

The oil sleeve 211 prevents hydraulic fluid from reaching the output shaft and thus contaminating underground water supplies.

The housing 243 of the pump drive mechanism of FIG. 2 comprises a base 244, side walls 246, a top 248, and a cover piece 250 above the adjusting nut 84. An expansion breather 252 is provided through the top plate 248.

An advantage of the version of the invention shown in FIG. 2 is that the thrust generated by the pump is transmitted to the housing via the thrust bearings 225 because the bearing housing 240 is secured to the variable speed drive housing. Thus, the motor does not have to pick up the thrust as in the version shown in FIG. 1.

A drive mechanism according to the present invention has many advantages. For example, it can be retrofitted to existing installations, or can easily be used with new installations. An existing installation is easily retrofitted in the field for variable speed by use of the adapter plate and a new hollow drive shaft stub. Another advantage is that full lateral adjustment of a deep well pump is possible. Furthermore, the variable speed housing does not need to carry the weight of the motor. As shown in FIG. 1, a light-weight sheet metal housing provides sufficient strength to contain the hydraulic fluid.

The complete drive unit has a low center of gravity with a light-weight variable speed unit mounted directly above the motor, thereby assuring stability in operation. Another advantage of the pump driving mechanism is that the variable speed transmission unit can be removed for service and the pump can continue to be used at constant speed by simply coupling the output shaft to the motor coupling 22.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A mechanism for driving a pump comprising:
   (a) a hollow shaft motor;
   (b) a rotatable output shaft having first and second ends and capable of being mechanically coupled to the pump at its second end, a portion of the output shaft between the first and second ends being within the hollow shaft of the motor;
   (c) a variable speed transmission unit adjacent the motor and mechanically coupled to the hollow shaft and mechanically coupled to the output shaft by coupling means for transmitting power from the motor to the output shaft for rotation of the output shaft at a rate proportional to the rate of rotation of the hollow shaft, wherein the coupling means rotates with the output shaft;
   (d) means for adjusting the position of the output shaft relative to the motor, the adjusting means being located on the opposite side of the variable speed transmission unit than the motor;
   (e) a rotatable sleeve around and radially spaced apart from the output shaft in the region between the transmission unit and the first end of the output shaft, the sleeve being capable of being mechanically coupled to the hollow shaft for rotation with the hollow shaft; and
   (f) thrust bearings between the coupling means and the sleeve for transmitting thrust therebetween.

2. A mechanism for driving a pump comprising:
   (a) a hollow shaft motor;
   (b) a rotatable output shaft having first and second ends and capable of being mechanically coupled to the pump at its second end, a portion of the output shaft between the first and second ends being within the hollow shaft of the motor;

(c) a variable speed transmission unit adjacent the motor and mechanically coupled to the hollow shaft and the output shaft for transmitting power from the motor to the output shaft for rotation of the output shaft at a rate proportional to the rate of rotation of the hollow shaft; and (d) means for adjusting the position of the output shaft relative to the motor, the adjusting means being located on the opposite side of the variable speed transmission unit than the motor, wherein the output shaft is not directly in contact with any bearings.

3. The mechanism of claim 2 including a rotatable sleeve around and radially spaced apart from the output shaft in the region between the transmission unit and the first end of the output shaft.

4. The mechanism of claim 3 in which the sleeve is capable of being mechanically coupled to the hollow shaft by coupling means for rotation with the hollow shaft.

5. The mechanism of claim 4 in which the coupling means rotates with the output shaft, and including thrust bearings between the coupling means and the sleeve for transmitting thrust therebetween.

6. A mechanism for driving a pump comprising:
(a) a rotatable output shaft for positioning within the hollow shaft of a hollow shaft motor, a first end portion and a second end portion of the output shaft extending beyond the corresponding ends of the hollow shaft, the second end portion being capable of being connected to the pump to be driven;
(b) a variable speed transmission unit between the ends of the output shaft and capable of being mechanically coupled to the hollow shaft;
(c) coupling means for mechanically coupling the transmission unit to the first end portion of the output shaft for transmitting power from the motor to the output shaft for rotation of the output shaft at a rate proportional to the rate of rotation of the hollow shaft; and
(d) adjusting means at the first end portion of the output shaft for adjusting the position of the output shaft relative to the motor and to the variable speed transmission unit, wherein when the pump driving mechanism is connected to the pump, the variable speed transmission unit is closer to the pump than is the adjusting means, wherein the output shaft is not directly in contact with any bearings.

7. The mechanism of claim 6 in which the variable speed transmission unit is a hydraulic unit.

8. The mechanism of claim 7 including a rotatable sleeve around and radially spaced apart from the output shaft in the section between the hydraulic transmission unit and the first end of the output shaft for preventing hydraulic fluid from reaching the output shaft.

9. The mechanism of claim 6 including a rotatable sleeve around and radially spaced apart from the output shaft in the section between the transmission unit and the first end of the output shaft.

10. The mechanism of claim 9 in which the sleeve is capable of being mechanically coupled to the hollow shaft for rotation with the hollow shaft.

11. The mechanism of claim 10 in which the coupling means rotates with the output shaft, and including thrust bearings between the coupling means and the sleeve for transmitting thrust therebetween.

12. The mechanism of claim 11 in which the sleeve includes an extending member that is positioned against the thrust bearings.

13. A mechanism for driving a pump comprising:
(a) a rotatable output shaft for positioning within the hollow shaft of a hollow shaft motor, a first end portion and a second end portion of the output shaft extending beyond the corresponding ends of the hollow shaft, the second end portion being capable of being connected to the pump to be driven;
(b) a variable speed transmission unit between the ends of the output shaft and capable of being mechanically coupled to the hollow shaft;
(c) coupling means for mechanically coupling the transmission unit to the first end portion of the output shaft for transmitting power from the motor to the output shaft for rotation of the output shaft at a rate proportional to the rate of rotation of the hollow shaft, the coupling means rotating with the output shaft;
(d) adjusting means at the first end portion of the output shaft for adjusting the position of the output shaft relative to the motor and to the variable speed transmission unit, wherein when the pump driving mechanism is connected to the pump, the variable speed transmission unit is closer to the pump than is the adjusting means;
(e) a rotatable sleeve around and radially spaced apart from the output shaft in the section between the transmission unit and the first end of the output shaft, the sleeve being capable of being mechanically coupled to the hollow shaft for rotation with the hollow shaft; and
(f) thrust bearings between the coupling means and the sleeve for transmitting thrust therebetween.

14. The mechanism of claim 13 in which the sleeve includes an extending member that is positioned against the thrust bearings.

15. The mechanism of claim 13 wherein the coupling means includes the sleeve means.

16. The mechanism of claim 13 in which the variable speed transmission unit is a hydraulic unit.

17. The mechanism of claim 16 including a rotatable sleeve around and radially spaced apart from the output shaft in the section between the hydraulic transmission unit and the first end of the output shaft for preventing hydraulic fluid from reaching the output shaft.

* * * * *